UNITED STATES PATENT OFFICE.

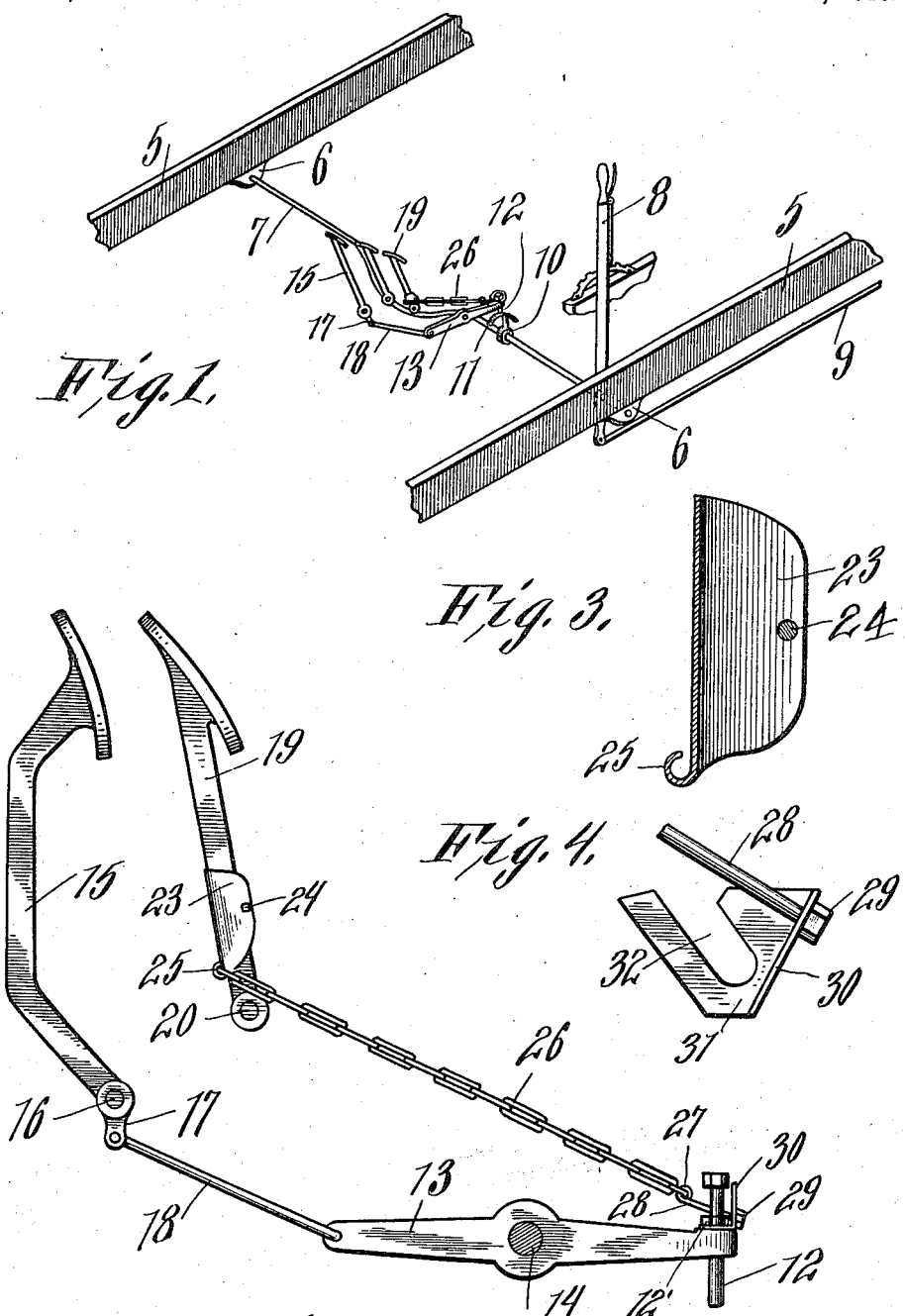

CLARK R. REID, OF DANVILLE, ILLINOIS.

BRAKE-PEDAL ATTACHMENT.

1,168,827.   Specification of Letters Patent.   Patented Jan. 18, 1916.

Application filed March 15, 1915. Serial No. 14,591.

*To all whom it may concern:*

Be it known that I, CLARK R. REID, a citizen of the United States, residing at Danville, in the county of Vermilion and State of Illinois, have invented certain new and useful Improvements in Brake-Pedal Attachments, of which the following is a specification.

My invention relates to means for connecting the brake pedal of an automobile, preferably a Ford, with the lever or member operating the friction mechanism, whereby upon the movement of the brake pedal in one direction the brakes will be set and the clutch mechanism rendered inactive.

An important object of the invention is to provide means of the above mentioned character, which will not interfere with, or damage, the operation of the clutch pedal and will not operate the brake pedal when the clutch pedal is moved.

A further object of the invention is to provide means of the above mentioned character, which may be attached to the brake pedal and clutch mechanism operating member without altering the construction thereof.

A further object of the invention is to provide means of the above mentioned character, which are simple in construction, inexpensive to manufacture, and easy to install.

Other objects and advantages of the invention will be apparent during the course of the following description.

In the accompanying drawings forming a part of this specification and in which like numerals are employed to designate like parts throughout the same, Figure 1 is a fragmentary perspective view of the frame of a Ford automobile, showing the brake and friction clutch pedals, brake lever, and associated elements, with my attachment applied thereto, Fig. 2 is an enlarged side elevation of the brake and clutch pedals with my attachment associated therewith, Fig. 3 is a central longitudinal section through an attaching sleeve for the brake pedal, and, Fig. 4 is a plan view of an attaching clip to be connected with the clutch lever.

In the drawings, wherein for the purpose of illustration is shown a preferred embodiment of my invention, the numeral 5 designates longitudinal beams included in the frame of a Ford automobile. Secured to and depending from the beams 5 are brackets or bearings 6, within which is journaled a transverse rock-shaft 7, having an emergency hand operated brake lever 8 rigidly connected therewith. The lever 8 extends downwardly below the rock-shaft 7 for a substantial distance and is pivotally connected with a rearwardly extending reach rod 9, connected with and operating the brakes.

Rigidly connected with the rock-shaft 7 between its ends is an arm or crank 10, carrying a cam head 11. This cam head slidably engages a pin or bolt 12, carried by one end of a friction clutch operating lever 13. The friction clutch operating lever is rigidly secured to a shaft 14, extending into the friction clutch casing (not shown) to operate the friction clutch mechanism, of the Ford automobile. This construction is well known and it is thought that no detail description or drawing thereof is necessary, except to state that when the rear end of the lever 13 is swung upwardly the friction clutch is rendered inactive.

The numeral 15 designates a vertically swinging clutch pedal, pivoted at 16 and provided with a depending crank 17. A rigid link or pitman 18 is pivotally connected with the lower end of the crank 17 and with the forward end of the friction clutch operating lever 13. This is the ordinary construction used in the Ford automobile and when the pedal 15 is forced forwardly the lever 13 is swung to render the clutch mechanism inactive.

The numeral 19 designates a brake pedal, adapted to swing in a vertical plane and pivoted at 20. This pedal is connected with the brake (not shown), as is customary.

My attachment embodies a connecting member or sleeve 23, preferably formed of suitably stiff and strong sheet metal. This sleeve is adapted to be arranged upon the brake lever 19 above its pivot and clamped thereto by means of a bolt 24, as shown. At its lower end the sleeve 23 is provided with a hook 25 to engage a chain 26, the hook preferably extending into one link of the chain. At its rear end the chain 26 is connected with the eye 27 of a bolt 28, carrying a nut 29. The bolt 28 is adapted to be passed through an aperture in a flange 30 formed upon a clip 31, the nut 29 preventing the removal of the bolt from the aperture. The body portion of the clip 31 is provided with a slot 32, adapted to receive the bolt or pin 12, the same being clamped thereto by a lock nut 12'.

Instead of employing the chain 26, I may employ any other suitable flexible element or connecting means and other means may be used for connecting the chain or flexible element with the pedal 19 and lever 13.

In operation, when it is desired to stop the automobile, the brake pedal 19 is forced forwardly whereby the brakes are applied, and the chain 26 moved forwardly to turn the lever 13, whereby the friction clutch mechanism is simultaneously rendered inactive. When the clutch pedal 15 is being operated to control the operation of the friction clutch, the brake mechanism is not disturbed, as the flexible element 26 cannot transmit any motion from the lever 13 to the pedal 19.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. An attachment for connecting the brake pedal and clutch mechanism controlling swinging lever carrying a bolt provided with a clamp nut, comprising a member to surround the brake pedal and be secured thereto, a plate having a slot to receive the bolt and to be held thereon by the clamp nut, and a relatively nonextensible flexible element connecting the member and the plate, substantially as described.

2. An attachment for connecting the brake pedal and clutch mechanism controlling swinging lever carrying a bolt, comprising a sleeve to be arranged upon the brake pedal, means to clamp the sleeve to the brake pedal, a member having an opening to receive the bolt, and a flexible relatively nonextensible element connecting the sleeve and member.

3. An attachment for connecting the brake pedal and clutch mechanism controlling swinging lever carrying a bolt, comprising a sleeve to be secured upon the brake pedal, a flanged plate having a slot to receive the bolt and adapted to be clamped to the bolt, and a flexible relatively nonextensible element attached to the sleeve and the flange.

4. In combination, a clutch pedal, a brake pedal, a swinging lever controlling the operation of clutch mechanism, a pitman pivotally connecting the clutch pedal and one end of the swinging lever, a bolt extending through an aperture in the opposite end of the swinging lever, a slotted plate adapted to be arranged upon the end of the lever to receive the bolt in the slot, a clamping nut carried by the bolt to bind the slotted plate to the lever, an apertured flange carried by the slotted plate, an eye bolt secured within the aperture of the flange, a flexible element having one end attached to the eye bolt, a sleeve clamped upon the brake pedal, and means for attaching the opposite end of the flexible element to the sleeve.

In testimony whereof I affix my signature in presence of two witnesses.

CLARK R. REID.

Witnesses:
O. D. MANN,
HELEN LUNZ.